US010692667B1

(12) United States Patent
Jhuang et al.

(10) Patent No.: US 10,692,667 B1
(45) Date of Patent: Jun. 23, 2020

(54) KEYBOARD KEYCAP CONNECTING ELEMENT

(71) Applicant: Primax Electronics Ltd., Taipei (TW)

(72) Inventors: Chuang-Shu Jhuang, Taipei (TW); Sheng-Huang Huang, Taipei (TW); Zhi-Hui Zeng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/292,799

(22) Filed: Mar. 5, 2019

(30) Foreign Application Priority Data

Dec. 21, 2018 (CN) .......................... 2018 1 1571931

(51) Int. Cl.
| G06F 3/02 | (2006.01) |
| H01H 13/70 | (2006.01) |
| H01H 13/705 | (2006.01) |
| H01H 13/7065 | (2006.01) |
| H01H 13/14 | (2006.01) |

(52) U.S. Cl.
CPC .......... *H01H 13/7006* (2013.01); *G06F 3/02* (2013.01); *H01H 13/14* (2013.01); *H01H 13/705* (2013.01); *H01H 13/7065* (2013.01); *H01H 2205/002* (2013.01)

(58) Field of Classification Search
CPC .. H01H 13/705; H01H 13/4065; H01H 13/14; H01H 3/02; G06F 3/0202; G06F 3/0224; G06F 3/02
See application file for complete search history.

(56) References Cited

U.S. PATENT DOCUMENTS

| 7,449,651 | B2 * | 11/2008 | Lin ........................ | H01H 3/125 |
| | | | | 200/344 |
| 8,629,362 | B1 * | 1/2014 | Knighton ............... | H01H 13/52 |
| | | | | 200/344 |
| 9,748,058 | B2 * | 8/2017 | Chen ...................... | H01H 13/84 |
| 9,842,710 | B2 * | 12/2017 | Maruyama ......... | H01H 13/7065 |
| 9,997,308 | B2 * | 6/2018 | Leong ................... | H01H 13/88 |

* cited by examiner

*Primary Examiner* — Vanessa Girardi
(74) *Attorney, Agent, or Firm* — Kirton McConkie; Evan R. Witt (57) ABSTRACT

A keyboard device includes a base, a wing-type connecting element and a keycap. The base plate includes a close-type connecting bracket. The wing-type connecting element includes a first frame and a second frame. A connecting shaft of the second frame is received within the close-type connecting bracket. Consequently, the wing-type connecting element is connected with the base plate. While the keycap is depressed, the connecting shaft is only allowed to be rotated and limited within the close-type connecting bracket. Since the swinging range of the wing-type connecting element is reduced, the keyboard device of the present invention is capable of improving the depressing stability of the keycap.

9 Claims, 6 Drawing Sheets

KEYBOARD KEYCAP CONNECTING ELEMENT

FIELD OF THE INVENTION

The present invention relates to an input device, and more particularly to a keyboard device with plural key structures.

BACKGROUND OF THE INVENTION

Generally, the widely-used peripheral input device of a computer system includes for example a mouse device, a keyboard device, a trackball device, or the like. Via the keyboard device, characters or symbols can be directly inputted into the computer system. Consequently, most users and most manufacturers of input devices pay much attention to the development of keyboard devices. The subject of the present invention is related to a keyboard device.

Figure 1:
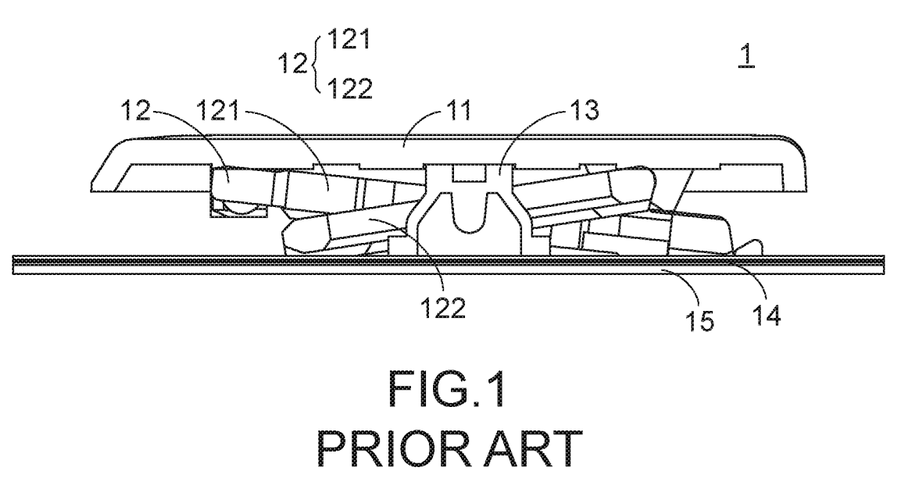
FIG. 1 is a schematic cross-sectional side view illustrating a conventional key structure.

A key structure of a keyboard device will be described as follows. The key structure comprises a scissors-type connecting element. FIG. 1 is a schematic cross-sectional side view illustrating a conventional key structure. As shown in FIG. 1, the conventional key structure 1 comprises a keycap 11, a scissors-type connecting element 12, a rubbery elastomer 13, a membrane switch circuit member 14 and a base plate 15. The keycap 11, the scissors-type connecting element 12, the rubbery elastomer 13 and the membrane switch circuit member 14 are supported by the base plate 15. The scissors-type connecting element 12 is used for connecting the base plate 15 and the keycap 11.

The scissors-type connecting element 12 is arranged between the base plate 15 and the keycap 11, and the base plate 15 and the keycap 11 are connected with each other through the scissors-type connecting element 12. The scissors-type connecting element 12 comprises a first frame 121 and a second frame 122. A first end of the first frame 121 is connected with the keycap 11. A second end of the first frame 121 is connected with the base plate 15. The rubbery elastomer 13 is enclosed by the scissors-type connecting element 12. The membrane switch circuit member 14 comprises plural key intersections (not shown). When one of the plural key intersections is triggered, a corresponding key signal is generated. The rubbery elastomer 13 is disposed on the membrane switch circuit member 14. Each rubbery elastomer 13 is aligned with a corresponding key intersection. When the rubbery elastomer 13 is depressed, the rubbery elastomer 13 is subjected to deformation to push the corresponding key intersection of the membrane switch circuit member 14. Consequently, the corresponding key signal is generated.

The operations of the conventional key structure 1 in response to the depressing action of the user will be illustrated as follows. Please refer to FIG. 1 again. When the keycap 11 is depressed, the keycap 11 is moved downwardly to push the scissors-type connecting element 12 in response to the depressing force. As the keycap 11 is moved downwardly relative to the base plate 15, the keycap 11 pushes the corresponding rubbery elastomer 13. At the same time, the rubbery elastomer 13 is subjected to deformation to push the membrane switch circuit member 14 and trigger the corresponding key intersection of the membrane switch circuit member 14. Consequently, the membrane switch circuit member 14 generates a corresponding key signal. When the keycap 11 is no longer depressed by the user, no external force is applied to the keycap 11 and the rubbery elastomer 13 is no longer pushed by the keycap 11. In response to the elasticity of the rubbery elastomer 13, the rubbery elastomer 13 is restored to its original shape to provide an upward elastic restoring force. Consequently, the keycap 11 is returned to its original position where it is not depressed. The structures and the operations of the conventional key structure have been mentioned as above.

However, while the keycap 11 is depressed, the first frame 121 and the second frame 122 are swung with the movement of the keycap 11. As the first frame 121 and the second frame 122 are swung, the first frame 121 and the second frame 122 are rocked. Since the keycap 11 is correspondingly rocked, the movement of the keycap is unstable. Moreover, after the first frame 121 and the second frame 122 are assembled, the first frame 121 and the second frame 122 are readily detached from the base plate 15 because of the structural limitations.

Therefore, there is a need of providing a keyboard device with enhanced assembling stability

SUMMARY OF THE INVENTION

An object of the present invention provides a keyboard device with enhanced assembling stability.

Another object of the present invention provides a keyboard device capable of overcoming the rocking problem of the keycap.

In accordance with an aspect of the present invention, there is provided a keyboard device. The keyboard device includes a base plate, a wing-type connecting element and a keycap. The wing-type connecting element is located over the base plate and connected with the base plate. The wing-type connecting element is permitted to be swung relative to the base plate. The wing-type connecting element includes a first frame and a second frame. The first frame is connected with the base plate and arranged near a first side of the base plate. The first frame includes a first position-limiting structure. The first position-limiting structure is disposed on a first lateral wall of the first frame. The second frame is connected with the base plate and arranged near a second side of the base plate. A portion of the second frame is inserted in the first frame so as to be connected with the first frame. The keycap is connected with the first frame and the second frame, and movable relative to the base plate. When the keycap is not depressed, the first position-limiting structure is contacted with the base plate. While the keycap is depressed, the first frame and the second frame are swung relative to the base plate, so that the first position-limiting structure is departed from the base plate.

In an embodiment, the first frame further includes a first connecting shaft, a second connecting shaft and an indentation. The first connecting shaft is located at a first end of the first frame and disposed on an outer side of the first end of the first frame. The first connecting shaft is connected with a sliding hook of the keycap. The second connecting shaft is disposed within a first lateral wall of the first frame, and disposed on an inner side of the first lateral wall. The second connecting shaft is connected with the base plate. The indentation is located at a second end of the first frame and formed in an inner side of the first frame. A second end of the second frame is received within the indentation. Consequently, the first frame and the second frame are combined together. The first position-limiting structure is disposed on the first lateral wall and arranged near the second end of the first frame.

In an embodiment, the first frame further includes a first perforation, which is formed in the first lateral wall of the first frame. A base hook of the base plate is inserted in the first perforation and connected with the second connecting shaft. The second connecting shaft is disposed within the first perforation.

In an embodiment, the second frame includes a rotation shaft, a third connecting shaft and a fourth connecting shaft. The rotation shaft is located at a first end of the second frame. The rotation shaft is inserted in the indentation of the first frame. Consequently, the first frame and the second frame are combined together, and the rotation shaft is rotatable within the indentation. The third connecting shaft is located at the second end of the second frame. The third connecting shaft is inserted in a fixed hook of the keycap. The fourth connecting shaft is disposed within a second lateral wall of the second frame, and disposed on an inner side of the second lateral wall. The fourth connecting shaft is connected with the base plate.

In an embodiment, the base plate includes a close-type connecting bracket, a base hook and a second position-limiting structure. The fourth connecting shaft is received within the close-type connecting bracket, so that the close-type connecting bracket is connected with the second frame. The base hook is arranged beside the close-type connecting bracket. The second connecting shaft is inserted in the base hook and connected with the first frame. The second position-limiting structure is arranged between the close-type connecting bracket and the base hook. The second position-limiting structure is contactable with the first position-limiting structure.

From the above descriptions, the present invention provides the keyboard device. The wing-type connecting element is connected with the base plate and the keycap. The close-type connecting bracket has a special shape. The base plate and the wing-type connecting element are combined together through the close-type connecting bracket. Since the fourth connecting shaft of the wing-type connecting element is received within the close-type connecting bracket, the swinging extent of the wing-type connecting element is smaller than the swinging extent of the conventional scissors-type connecting element. Since the swinging extent of the wing-type connecting element is reduced when compared with the conventional scissors-type connecting element, the wing-type connecting element is swung more stably. Consequently, the depressing stability of the keycap is enhanced. In addition, the thickness of the keyboard device is reduced. Moreover, the first frame and the second frame are combined together through the rotation shafts and the indentations. Consequently, the process of assembling the first frame and the second frame is simplified when compared with the process of assembling the conventional scissors-type connecting element. In other words, the keyboard device of the present invention is cost-effective.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technologies, the present invention provides a keyboard device.

Figure 2:
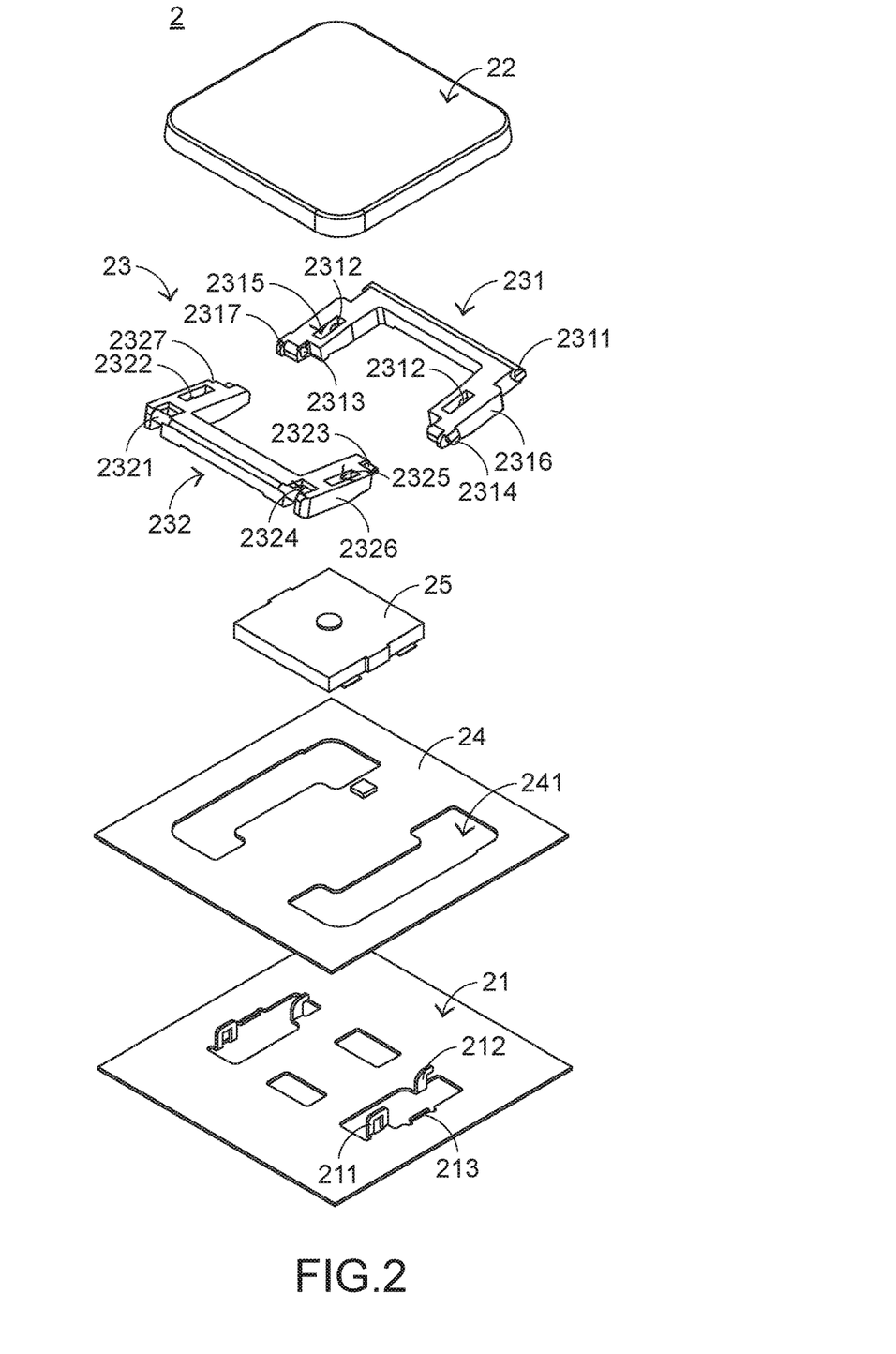
FIG. 2 is a schematic exploded view illustrating a portion of a keyboard device according to an embodiment of the present invention and taken along a viewpoint.
Figure 3:
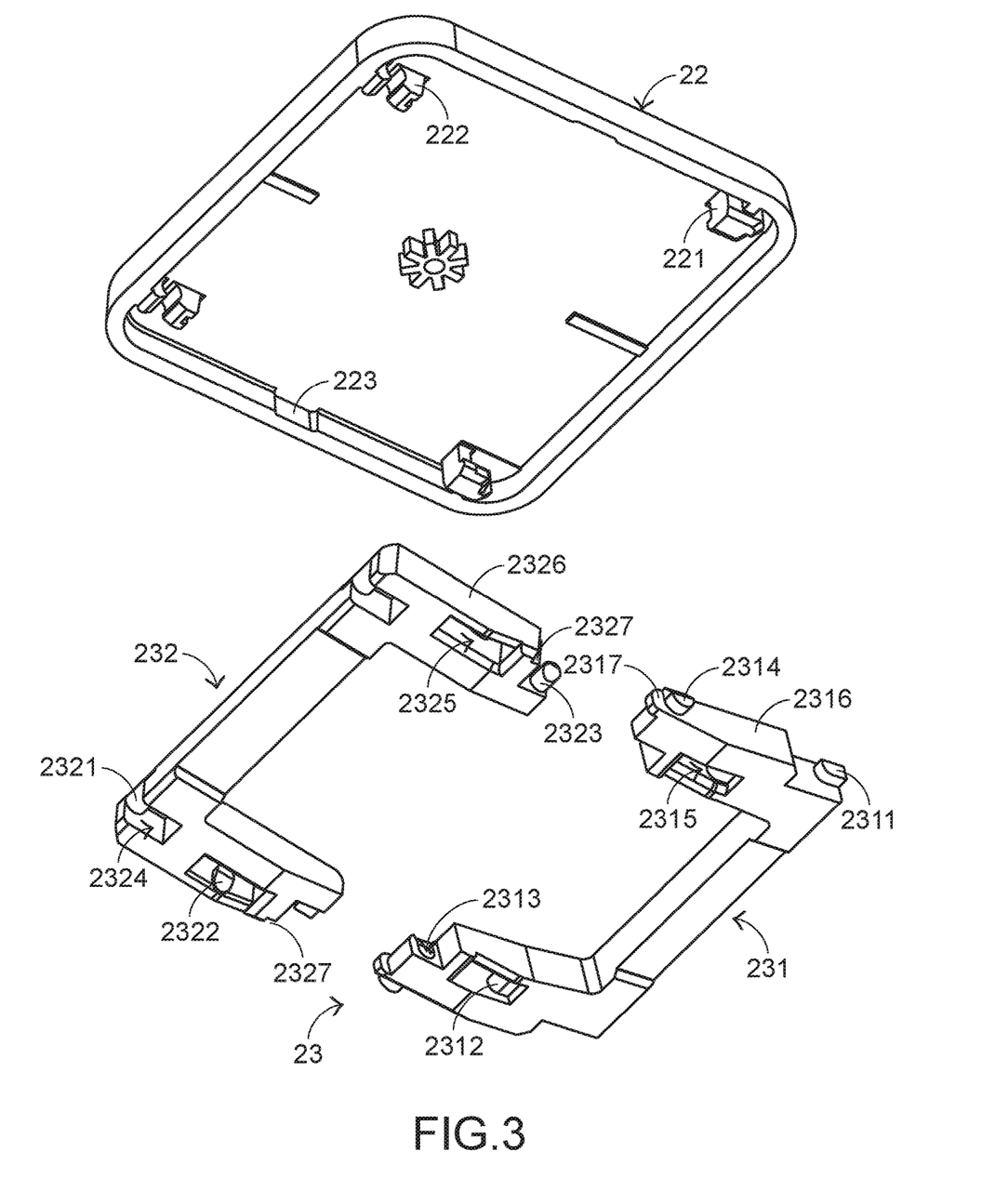
FIG. 3 is a schematic exploded view illustrating a keycap and a wing-type connecting element of the keyboard device according to the embodiment of the present invention and taken along another viewpoint.

Hereinafter, the structure of the keyboard device of the present invention will be illustrated with reference to FIGS. 2 and 3. FIG. 2 is a schematic exploded view illustrating a portion of a keyboard device according to an embodiment of the present invention and taken along a viewpoint. FIG. 3 is a schematic exploded view illustrating a keycap and a wing-type connecting element of the keyboard device according to the embodiment of the present invention and taken along another viewpoint. The keyboard device 2 comprises a base plate 21, plural keycaps 22, plural wing-type connecting elements 23, a circuit board 24 and plural triggering switches 25. For succinctness, only one keycap 22, one wing-type connecting element 23 and one triggering switch 25 are shown in the drawings.

The base plate 21 comprises plural close-type connecting brackets 211, plural base hooks 212 and plural second position-limiting structures 213. The plural close-type connecting brackets 211 are located at a second side of the base plate. The plural base hooks 212 are arranged beside the corresponding close-type connecting brackets 211. The second position-limiting structures 213 are arranged between the corresponding close-type connecting brackets 211 and the corresponding base hooks 212.

The wing-type connecting element 23 is located over the base plate 21. In addition, the wing-type connecting element 23 is connected with the corresponding connecting brackets 211 and the corresponding base hooks 212 of the base plate 21. The wing-type connecting elements 23 can be swung relative to the base plate 21. Each wing-type connecting element 23 is aligned with a corresponding keycap 22. In an embodiment, the wing-type connecting element 23 comprises a first frame 231 and a second frame 232. The first frame 231 is connected with the plural base hooks 212 of the base plate 21 and arranged near a first side of the base plate 21. The second frame 232 is connected with the plural connecting brackets 211 of the base plate 21 and arranged near the second side of the base plate 21. A portion of the second frame 232 is inserted into the first frame 231, and thus the second frame 232 is connected with the first frame 231.

The keycap 22 is connected with the corresponding first frame 231 and the corresponding second frame 232. The keycap 22 is movable upwardly or downwardly relative to the base plate 21. In this embodiment, the keycap 22 comprises plural sliding hooks 221, plural fixed hooks 222 and plural concave structures 223.

Figure 4:
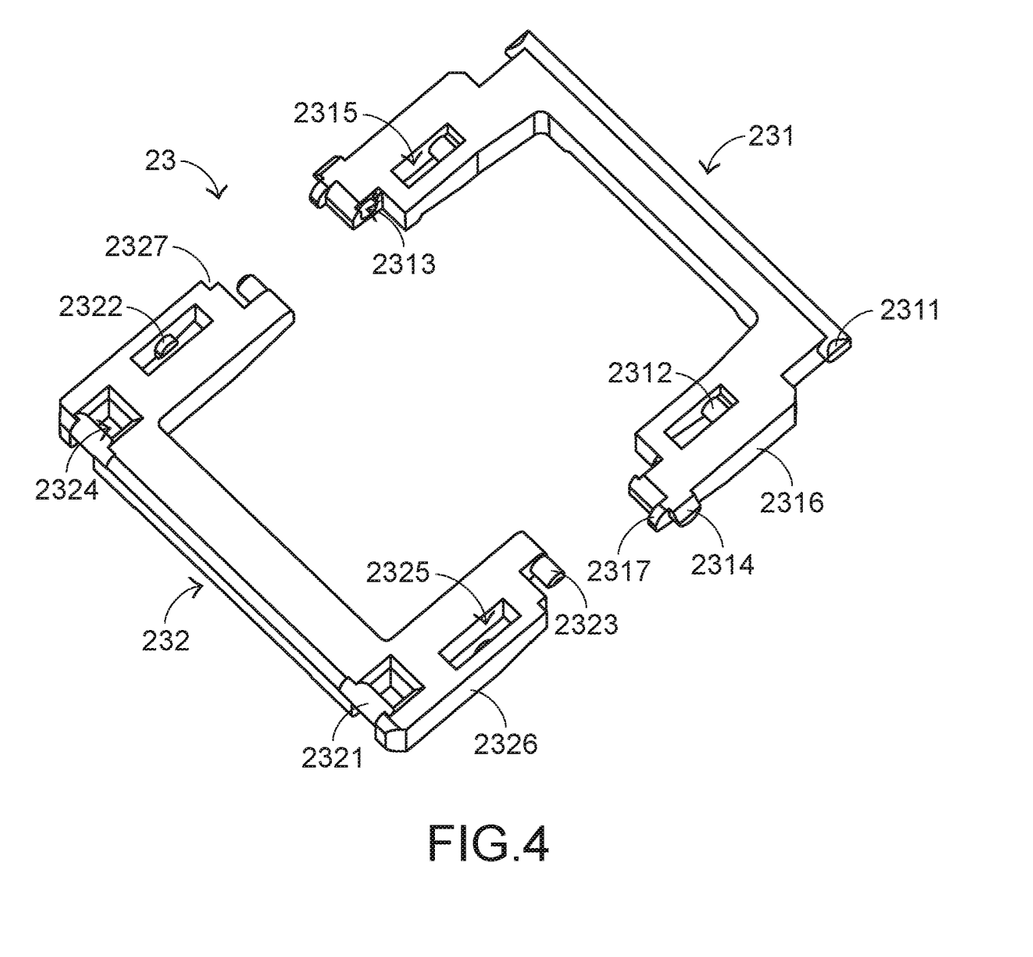
FIG. 4 is a schematic exploded view illustrating the wing-type connecting element of the keyboard device according to the embodiment of the present invention.

Please refer to FIGS. 2, 3 and 4. FIG. 4 is a schematic exploded view illustrating the wing-type connecting element of the keyboard device according to the embodiment of the present invention. The first frame 231 of the wing-type connecting element 23 comprises plural first connecting shafts 2311, plural second connecting shafts 2312, plural indentations 2313, plural first position-limiting structures 2314 and plural first perforations 2315. The first connecting shafts 2311 are located at a first end of the first frame 231 and disposed on an outer side of the first end of the first frame 231. The first connecting shafts 2311 are connected with the corresponding sliding hooks 221 of the keycap 22. The second connecting shafts 2312 are disposed within a first lateral wall 2316 of the first frame 231 and disposed on an inner side of the first lateral wall 2316. The second connecting shafts 2312 are connected with the base plate 21. The indentations 2313 are located at a second end of the first frame 231 and formed in an inner side of the second end of the first frame 231. A second end of the second frame 232 is received within the indentations 2313. Consequently, the first frame 231 and the second frame 232 are combined together. The first position-limiting structures 2314 are disposed on the first lateral wall 2316 of the first frame 231 and arranged near the second end of the first frame 231. Moreover, the first position-limiting structures 2314 are aligned with the corresponding concave structures 223 of the keycap 22. The first perforations 2315 are formed in the first lateral wall 2316 of the first frame 231. The second connecting shafts 2312 are disposed within the corresponding first perforations 2315.

In an embodiment, the first frame 231 has an inverted U shape. Moreover, the plural first connecting shafts 2311, the plural second connecting shafts 2312, the plural indentations 2313, the plural first position-limiting structures 2314 and the plural first perforations 2315 of the first frame 231 are in a symmetrical arrangement. It is noted that numerous modifications and alternations may be made while retaining the teachings of the present invention. For example, one or plural ones for each of the above components may be feasible according to the practical requirements.

The second frame 232 comprises plural third connecting shafts 2321, plural fourth connecting shafts 2322, plural rotation shafts 2323, plural second perforations 2324 and plural third perforations 2325. The third connecting shafts 2321 are located at a second end of the second frame 232. The third connecting shafts 2321 are inserted into the corresponding fixed hooks 222 of the keycap 22. The fourth connecting shafts 2322 are disposed within a second lateral wall 2326 of the second frame 232 and disposed on an inner side of the second lateral wall 2326. The fourth connecting shafts 2322 are connected with the base plate 21. The rotation shafts 2323 are located at a first end of the second frame 232. The rotation shafts 2323 are inserted into the corresponding indentations 2313 of the first frame 231. Consequently, the first frame 231 and the second frame 232 are combined together. In addition, the rotation shafts 2323 are rotatable within the corresponding indentations 2313. The second perforations 2324 are formed in the second end of the second frame 232 and arranged beside the corresponding third connecting shafts 2321. The third perforations 2325 are formed in the second lateral wall 2326 of the second frame 232. The fourth connecting shafts 2322 are disposed within the corresponding third perforations 2325. Moreover, the length of the fourth connecting shaft 2322 is smaller than the width of the corresponding third perforation 2325.

In an embodiment, the second frame 232 also has an inverted U shape. Moreover, the plural third connecting shafts 2321, the plural fourth connecting shafts 2322, the plural rotation shafts 2323, the plural second perforations 2324 and the plural third perforations 2325 of the second frame 232 are in a symmetrical arrangement. It is noted that numerous modifications and alternations may be made while retaining the teachings of the present invention. For example, one or plural ones for each of the above components may be feasible according to the practical requirements.

As mentioned above, the length of the fourth connecting shaft 2322 is smaller than the width of the corresponding third perforation 2325. Consequently, the close-type connecting brackets 211 can be inserted into the corresponding third perforations 2325, and the fourth connecting shafts 2322 are inserted into the corresponding close-type connecting brackets 211. That is, the fourth connecting shafts 2322 are received within the corresponding close-type connecting brackets 211. Similarly, the base hooks 212 are inserted into the corresponding first perforations 2315, and thus the second connecting shafts 2312 are received within the corresponding base hooks 212. Consequently, the second connecting shafts 2312 are connected with the corresponding base hooks 212. In such way, the base plate 21 is connected with the first frame 231 and the second frame 232. Moreover, the close-type connecting brackets 211 are inserted into the corresponding third perforations 2325 and connected with the fourth connecting shafts 2322. The sliding hooks 221 of the keycap 22 are connected with the corresponding first connecting shafts 2311. The fixed hooks 222 of the keycap 22 are penetrated through the corresponding second perforations 2324 and connected with the corresponding third connecting shafts 2321. Consequently, the keycap 22 is connected with the first frame 231 and the second frame 232.

Figure 5:
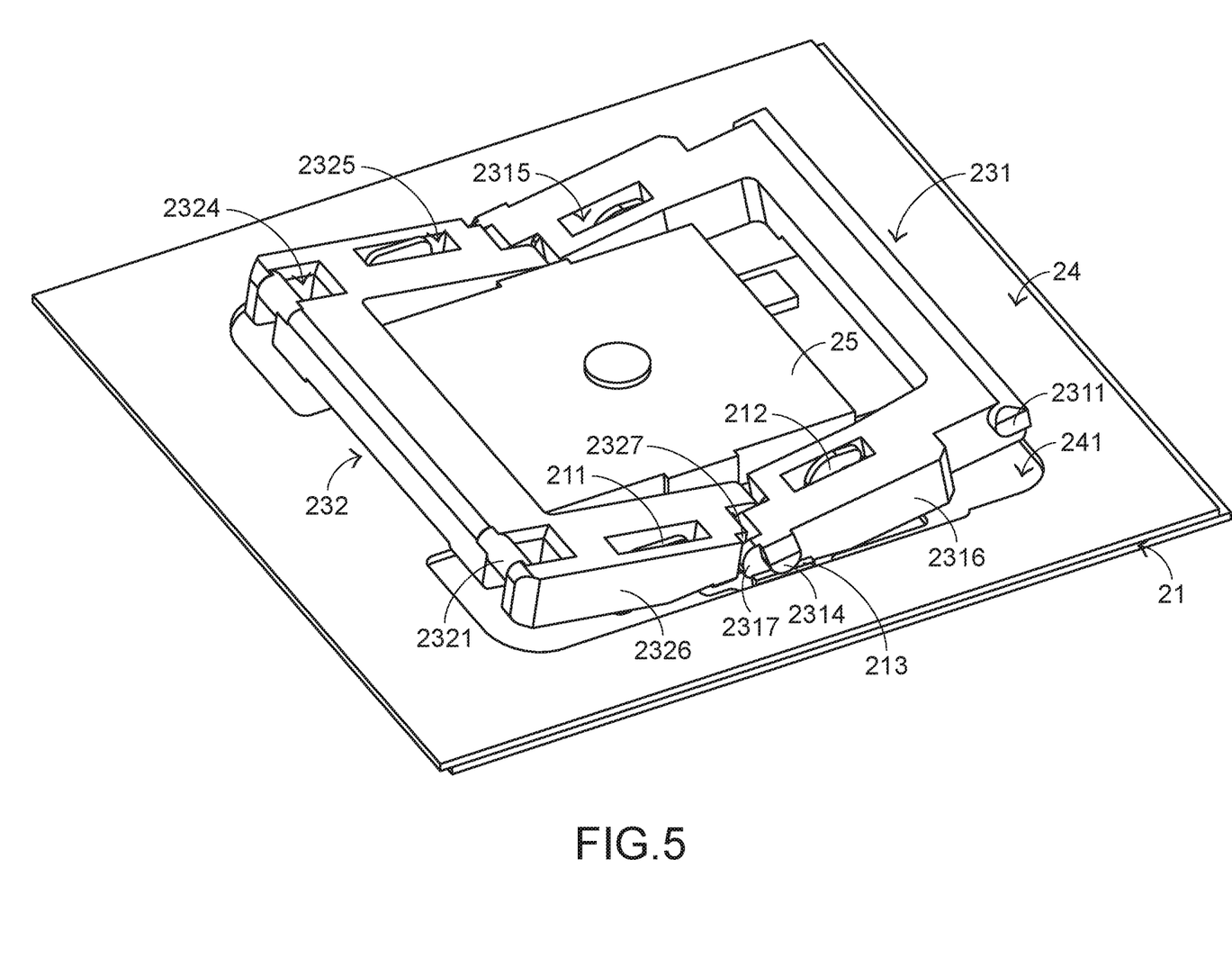
FIG. 5 is a schematic perspective view illustrating a portion of the keyboard device according to the embodiment of the present invention, in which the keycap is not depressed.

Please refer to FIGS. 2, 3 and 5. FIG. 5 is a schematic perspective view illustrating a portion of the keyboard device according to the embodiment of the present invention, in which the keycap is not depressed. The circuit board 24 is located over the base plate 21. The triggering switches 25 are arranged between the corresponding keycaps 22 and the circuit board 24. The triggering switches 25 are electrically connected with the circuit board 24. When the keycap 22 is moved downwardly to trigger the corresponding triggering switch 25, a key signal corresponding to the keycap 22 is generated by the corresponding triggering switch 25. The key signal is outputted from the circuit board 24. The circuit board 24 comprises plural openings 241. Each opening 241 is aligned with one close-type connecting bracket 211 and one base hooks 212. When the circuit board 24 is stacked on the base plate 21, the plural close-type connecting brackets 211 and the plural base hooks 212 are penetrated through the corresponding openings 241 and connected with the first frame 231 and the second frame 232.

In this embodiment, the triggering switches 25 and the circuit board 24 cooperate to generate the key signals, and the triggering switches 25 are installed on the circuit board 24 according to a surface mount technology (SMT). It is noted that numerous modifications and alternations may be made while retaining the teachings of the present invention. For example, in another embodiment, rubbery elastomers (or metal domes) and a membrane switch circuit board cooperate to generate the key signals.

Please refer to FIG. 5 again. The base plate 21, the corresponding wing-type connecting element 23, the circuit board 24 and the corresponding triggering switch 25 are combined together. Since the keycap 22 is not depressed, the wing-type connecting element 23 is in a non-parallel state. Meanwhile, the second position-limiting structures 213 of the base plate 21 are contacted with the corresponding first position-limiting structures 2314 of the first frame 231.

Moreover, the second position-limiting structures 213 are located under the corresponding concave structures 223 of the keycap 22.

Figure 6:
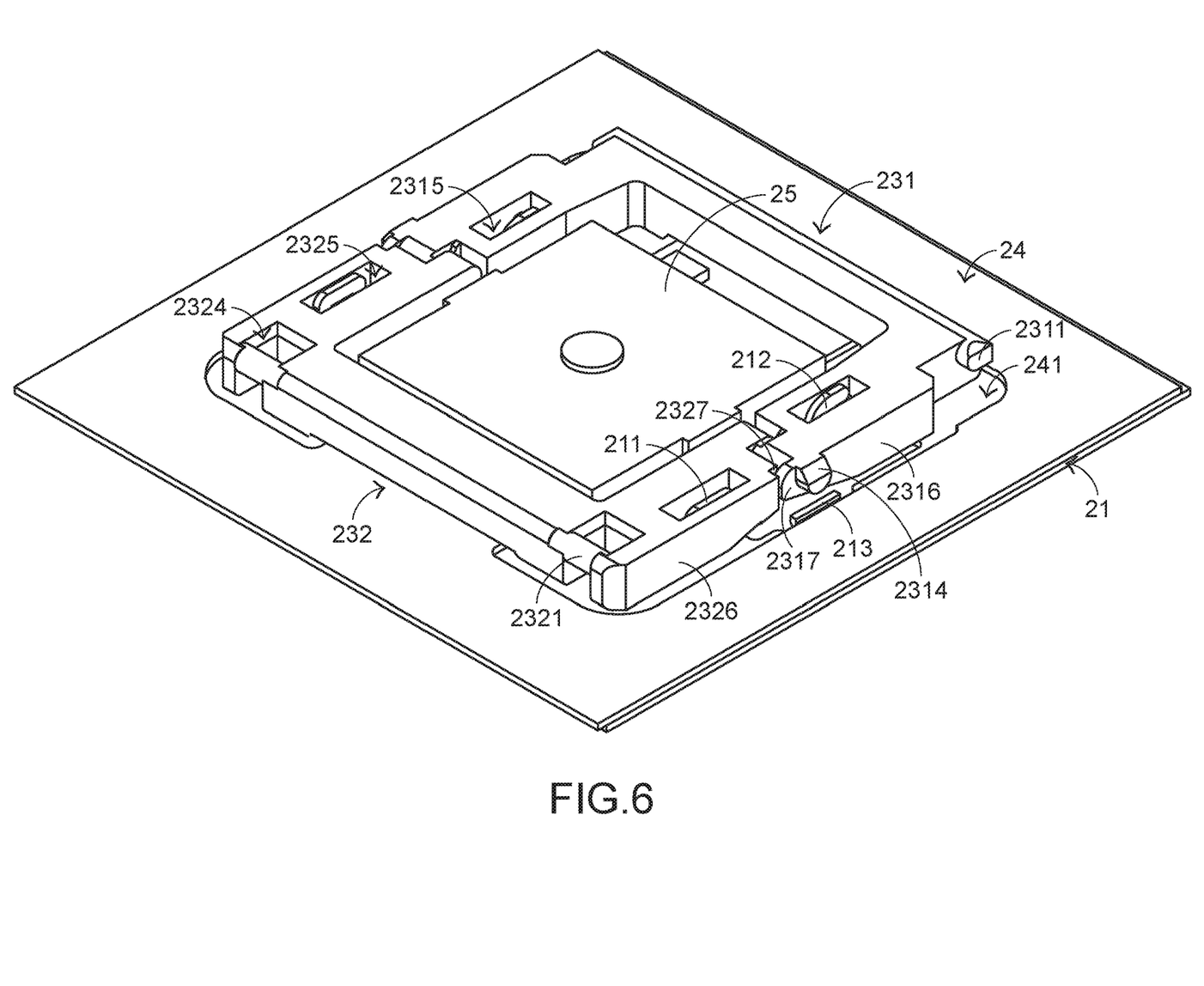
FIG. 6 is a schematic perspective view illustrating a portion of the keyboard device according to the embodiment of the present invention, in which the keycap is depressed.

Please refer to FIGS. 5 and 6. FIG. 6 is a schematic perspective view illustrating a portion of the keyboard device according to the embodiment of the present invention, in which the keycap is depressed. While the keycap 22 is depressed, the keycap 22 is moved downwardly in a vertical direction to push the first connecting shafts 2311 and the third connecting shafts 2321. Consequently, the second frame 232 is swung relative to the indentations 2313 by using the rotation shafts 2323 as fulcrums. Consequently, the first frame 231 and the second frame 232 are swung relative to the base plate 21. While the keycap 22 is moved downwardly, the first connecting shafts 2311 are moved within the corresponding sliding hooks 221 of the keycap 22, and the second connecting shafts 2312 are moved within the corresponding base hooks 212 of the base plate 21. In addition, the third connecting shafts 2321 are rotated within the corresponding fixed hooks 222, and the fourth connecting shafts 2322 are rotated within the corresponding close-type connecting brackets 211. As the first frame 231 is swung, the first position-limiting structures 2314 are departed from the corresponding position-limiting structures 213 and not contacted with the corresponding position-limiting structures 213.

As the keycap 22 is continuously moved downwardly to push the corresponding triggering switch 25, the triggering switch 25 is triggered to generate the key signal. Moreover, the key signal corresponding to the keycap 22 is outputted from the circuit board 24. Meanwhile, the first frame 231 and the second frame 232 are in parallel with each other. Moreover, the first position-limiting structures 2314 departed from the corresponding position-limiting structures 213 are accommodated within the corresponding concave structures 223 of the keycap 22.

When the triggering switch 25 is no longer pushed by the keycap 22, the keycap 22 is moved upwardly in the vertical direction and returned to its original position in response to an elastic force provided by an elastic element of the triggering switch 25. As the keycap 22 is moved upwardly in the vertical direction, the first frame 231 and the second frame 232 are swung and restored to the state of FIG. 5.

Please refer to FIGS. 4 and 5 again. The second frame 232 further comprises plural notches 2327. The plural notches 2327 are formed in the second lateral wall 2326. The first frame 231 further comprises plural protrusion structures 2317. The plural protrusion structures 2317 are protruded from the second end of the first frame 231. When the first frame 231 and the second frame 232 are combined together, the plural protrusion structures 2317 are received within the corresponding notches 2327 (see FIG. 5). Consequently, the frame 231 and the second frame 232 are not separated from each other during the swinging process.

In this embodiment, the first position-limiting structures 2314 are bulges, and the position-limiting structures 213 are raised structures. It is noted that numerous modifications and alternations may be made while retaining the teachings of the present invention. For example, in another embodiment, the first frame is equipped with raised structures, and the base plate is equipped with the corresponding bulges.

The following three aspects should be specially described.

Firstly, the protrusion structure 2317 further comprises a fillet structure to assist in swinging action of the first frame 231 and the second frame 232 relative to the base plate 21. Since the swinging action of the first frame 231 and the second frame 232 is smooth, the tactile feel of depressing the keycap 22 is enhanced.

Secondly, since the second connecting shafts 2312 are disposed within the corresponding first perforations 2315, the second connecting shafts 2312 become the structures of the first frame 231 to be connected with the base plate 21. When comparison with the connecting shaft on the lateral wall of the first frame of the conventional keyboard device, the second connecting shafts 2312 of the present invention have enhanced structural strength. Consequently, the possibility of causing damage of the first frame 231 is largely reduced. The fourth connecting shafts 2322 of the second frame 232 provide the similar efficacy. Consequently, the possibility of causing damage of the second frame 232 is largely reduced.

Thirdly, the structure of the keyboard device 2 of the present invention is specially designed to provide the following benefits. While the keycap 22 is moved upwardly or downwardly, the first position-limiting structure 2314 is moved in the range between the second position-limiting structure 213 of the base plate 21 and the concave structure 223 of the keycap 22, and the first position-limiting structure 2314 is contacted with the second position-limiting structure 213. In other words, the travelling distance of the keycap 22 is determined according to the height of the second position-limiting structure 213. In case that the larger travelling distance is required, the height of the second position-limiting structure is reduced to increase the travelling distance of the keycap. Whereas, in case that the smaller travelling distance is required, the height of the second position-limiting structure is increased to shorten the travelling distance of the keycap. Since the keycap of the present invention has the adjustable travelling distance, the keycap of the present invention can be applied to the keyboard devices of various electronic devices (or the keyboard devices requiring different travelling distances). In other words, the keyboard device of the present invention can be considered as a universal design.

From the above descriptions, the present invention provides the keyboard device. The wing-type connecting element is connected with the base plate and the keycap. The close-type connecting bracket has a special shape. The base plate and the wing-type connecting element are combined together through the close-type connecting bracket. Since the fourth connecting shaft of the wing-type connecting element is received within the close-type connecting bracket, the swinging extent of the wing-type connecting element is smaller than the swinging extent of the conventional scissors-type connecting element. Since the swinging extent of the wing-type connecting element is reduced when compared with the conventional scissors-type connecting element, the wing-type connecting element is swung more stably. Consequently, the depressing stability of the keycap is enhanced. In addition, the thickness of the keyboard device is reduced. Moreover, the first frame and the second frame are combined together through the rotation shafts and the indentations. Consequently, the process of assembling the first frame and the second frame is simplified when compared with the process of assembling the conventional scissors-type connecting element. In other words, the keyboard device of the present invention is cost-effective.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A keyboard device, comprising:
   a base plate;
   a wing-type connecting element located over the base plate and connected with the base plate, wherein the wing-type connecting element is permitted to be swung relative to the base plate, and the wing-type connecting element comprises a first frame and a second frame, wherein the first frame is connected with the base plate and arranged near a first side of the base plate, the first frame comprises a first position-limiting structure, and the first position-limiting structure is disposed on a first lateral wall of the first frame, wherein the second frame is connected with the base plate and arranged near a second side of the base plate, and a portion of the second frame is inserted in the first frame so as to be connected with the first frame; and
   a keycap connected with the first frame and the second frame, and movable relative to the base plate, wherein when the keycap is not depressed, the first position-limiting structure is contacted with the base plate, wherein while the keycap is depressed, the first frame and the second frame are swung relative to the base plate, so that the first position-limiting structure is departed from the base plate,
   wherein the first frame further comprises:
   a first connecting shaft located at a first end of the first frame and disposed on an outer side of the first end of the first frame, wherein the first connecting shaft is connected with a sliding hook of the keycap;
   a second connecting shaft disposed within a first lateral wall of the first frame, and disposed on an inner side of the first lateral wall, wherein the second connecting shall is connected with the base plate; and
   an indentation located at a second end of the first frame and formed in an inner side of the first frame, wherein a second end of the second frame is received within the indentation, so that the first frame and the second frame are combined together,
   wherein the first position-limiting structure is disposed on the first lateral wall and arranged near the second end of the first frame.

2. The keyboard device according to claim 1, wherein the first frame further comprises a first perforation, which is formed in the first lateral wall of the first frame, wherein a base hook of the base plate is inserted in the first perforation and connected with the second connecting shaft, and the second connecting shaft is disposed within the first perforation.

3. The keyboard device according to claim 1, wherein the second frame comprises:
   a rotation shaft located at a first end of the second frame, wherein the rotation shaft is inserted in the indentation of the first frame, so that the first frame and the second frame are combined together and the rotation shaft is rotatable within the indentation;
   a third connecting shaft located at the second end of the second frame, wherein the third connecting shaft is inserted in a fixed hook of the keycap; and
   a fourth connecting shaft disposed within a second lateral wall of the second frame, and disposed on an inner side of the second lateral wall, wherein the fourth connecting shaft is connected with the base plate.

4. The keyboard device according to claim 3, wherein the second frame further comprises a notch, and the first frame further comprises a protrusion structure, wherein the notch is formed in the second lateral wall, and the protrusion structure is protruded from the second end of the first frame, wherein when the first frame and the second frame are combined together, the protrusion structure is received within the notch, so that the frame and the second frame are not separated from each other.

5. The keyboard device according to claim 3, wherein the base plate comprises:
   a close-type connecting bracket, wherein the fourth connecting shaft is received within the close-type connecting bracket, so that the close-type connecting bracket is connected with the second frame;
   a base hook arranged beside the close-type connecting bracket, wherein the second connecting shaft is inserted in the base hook and connected with the first frame; and
   a second position-limiting structure arranged between the close-type connecting bracket and the base hook, wherein the second position-limiting structure is contactable with the first position-limiting structure.

6. The keyboard device according to claim 5, wherein a travelling distance of the keycap is determined according to a height of the second position-limiting structure.

7. The keyboard device according to claim 5, wherein when the keycap is not depressed, the first frame and the second frame are is a non-parallel state, and the first position-limiting structure and the second position-limiting structure are in contact with each other, wherein while the keycap is depressed, the first frame and the second frame are swung relative to the base plate to be in parallel with each other, so that the first position-limiting structure is separated from the second position-limiting structure and moved to a concave structure of the keycap.

8. The keyboard device according to claim 5, wherein while the keycap is depressed and the first frame and the second frame are swung relative to the base plate, the first connecting shaft is moved within the sliding hook, the second connecting shaft is moved within the base hook, the third connecting shaft is moved within the fixed hook, and the fourth connecting shaft is moved within the close-type connecting bracket.

9. The keyboard device according to claim 5, wherein the second frame further comprises:
   a second perforation formed in the second end of the second frame and arranged beside the third connecting shaft, wherein the fixed hook is penetrated through the second perforation; and
   a third perforation formed in the second lateral wall of the second frame, wherein the close-type connecting bracket is inserted in the third perforation and connected with the fourth connecting shaft, wherein the fourth connecting shaft is received within the third perforation, and a length of the fourth connecting shaft is smaller than a width of the third perforation.

\* \* \* \* \*